Sept. 16, 1958  F. M. GUY ET AL  2,852,286
RESILIENT BUSHING FOR BALL-AND-SOCKET TYPE BEARING
Filed May 7, 1951  3 Sheets-Sheet 2

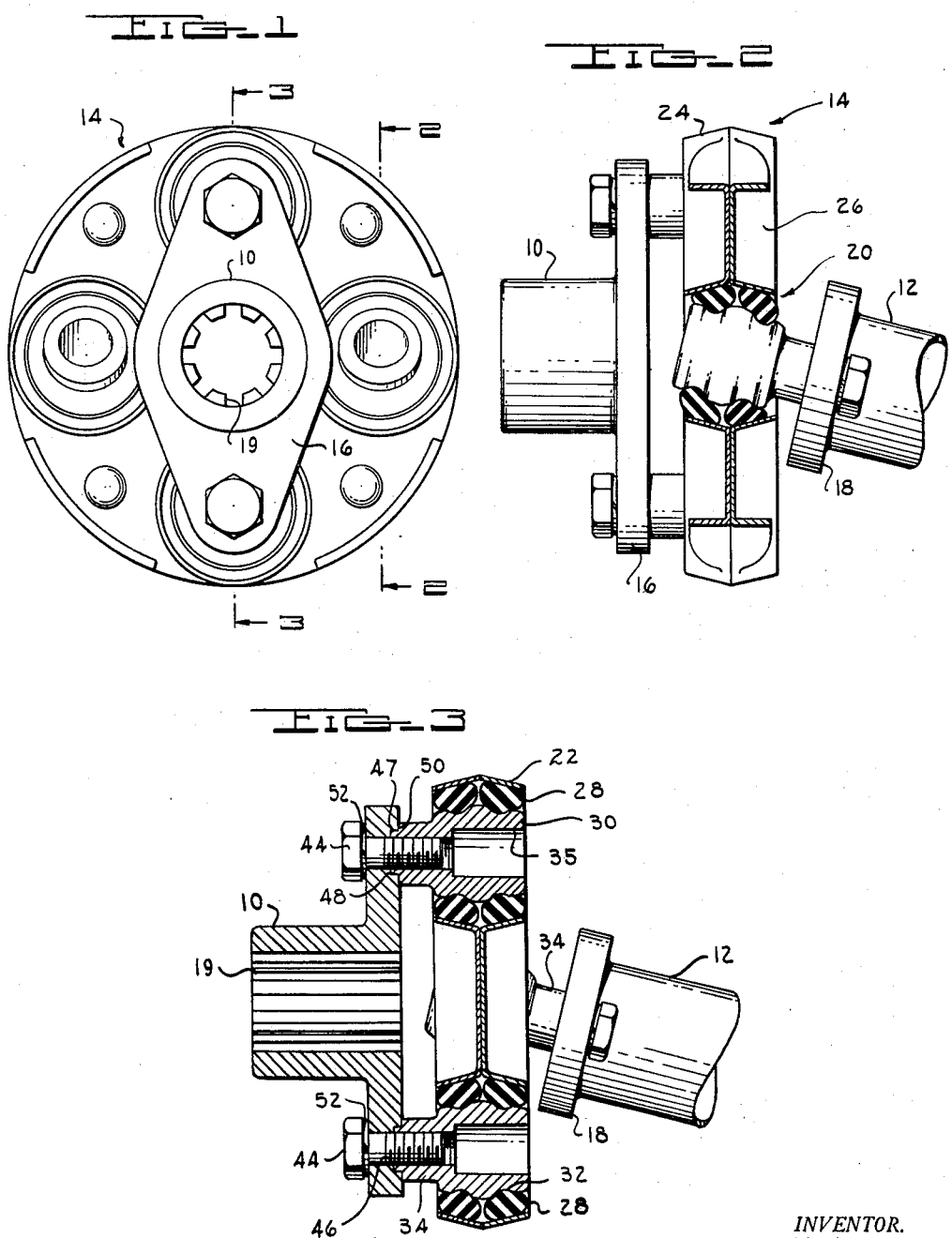

INVENTOR.
FREDERICK M. GUY
KURT SAURER
BY

ATTORNEY

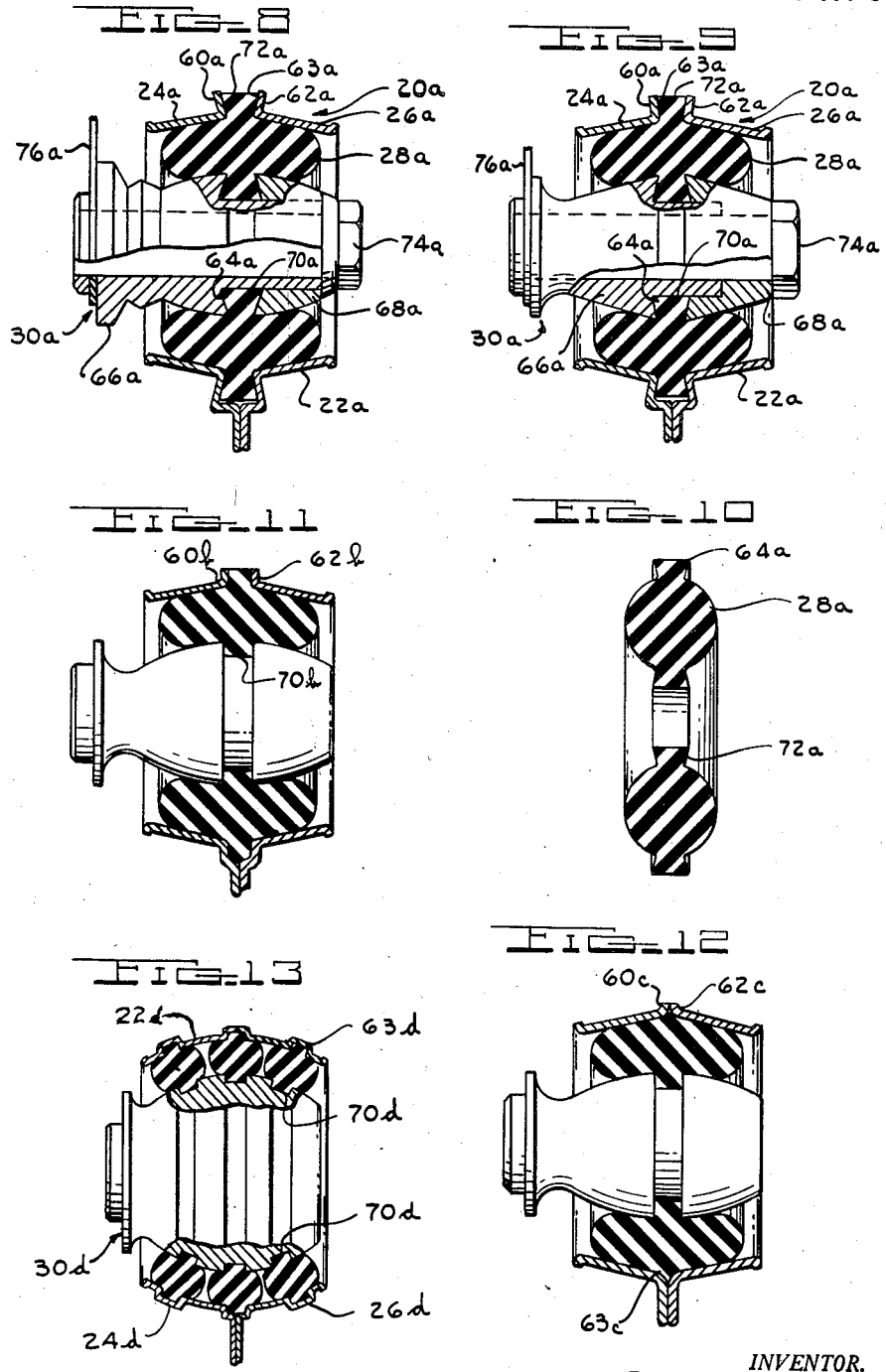

United States Patent Office 2,852,286
Patented Sept. 16, 1958

2,852,286

RESILIENT BUSHING FOR BALL-AND-SOCKET TYPE BEARING

Frederick M. Guy and Curt Saurer, Detroit, Mich., assignors to U. S. Universal Joints Company, Detroit, Mich., a corporation of Michigan Application May 7, 1951, Serial No. 225,040

1 Claim. (Cl. 287—85)

The present invention relates to a resilient bushing construction and to a novel method of manufacturing the same.

Resilient bushings of the type provided by the present invention generally consist of a central connector member, an outer shell surrounding said connector member and spaced therefrom, and a resilient body disposed between the shell and connector member.

These resilient bushings are used in the construction of engine mountings, spring shackles, universal joints, clutches, and the like, and also are used as sound insulators, vibration dampeners, and resilient cushions.

The present invention is an improvement on the construction disclosed in the Frederick M. Guy patent, No. 1,978,940, dated October 30, 1934 and may be used in such constructions as revealed in the Guy patent, No. 1,978,939, dated October 30, 1934.

Prior to the present invention, a compact resilient bushing had been sought which would have a substantial torque capacity, and which at the same time would eliminate the usual high resistance to angular and longitudinal movement of the component parts of the bushing. To provide a resilient bushing having satisfactory torque capacity, it had generally been necessary to use a heavy rubber element, and preload such rubber element to such an extent that the element would be under excessive compression in its normal undisplaced position.

Therefore, it is a primary object of the present invention to provide a resilient bushing which has a high torque capacity, and at the same time, minimizes the resistance to angular and longitudinal movement.

It is another object of the present invention to provide a resilient bushing having a resilient body wherein the stresses in said resilient body during displacement of the component parts of the bushing are equalized, thus reducing the heat generated during displacement of the resilient body when the bushing is in use under operating conditions.

It is another object of the present invention to provide an efficient resilient bushing wherein the costly processes of bonding the resilient element to the other parts of the bushing are eliminated, thus providing a low-cost bushing.

It is another object of the present invention to provide a resilient bushing comprising a core, an outer shell, and a resilient body portion disposed therebetween wherein the resilient body portion is divided to eliminate stress concentration.

It is another object of the present invention to provide a resilient bushing which is easy to assemble within commercial tolerances, and which is readily adapted for economical manufacture by mass production methods.

It is a further object of the present invention to provide a method of constructing a bushing of the aforementioned type which is simple and efficient, and wherein the said bushings can be produced at a high rate of speed.

Other objects of this invention will appear in the following description and appended claim, reference being had to the accompanying drawings forming a part of this specification wherein like reference characters designate corresponding parts in the several views.

In the drawings:

Fig. 1 is an end elevation of a universal coupling joining two abutting shaft flanges and using one embodiment of the resilient bushing of the present invention, the horizontally disposed shaft flange being in axial misalignment.

Fig. 2 is a side elevational section taken along the line 2—2 in the direction of the arrows, Fig. 1.

Fig. 3 is a midsectional elevation taken along the line 3—3 in the direction of the arrows, Fig. 1.

Figure 5:
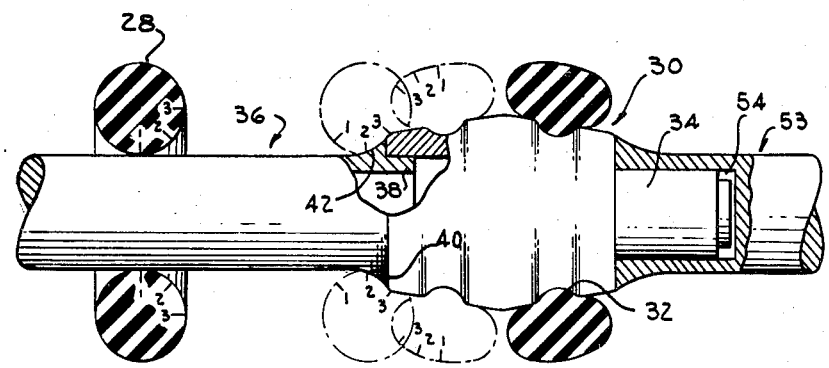
Figure 4:
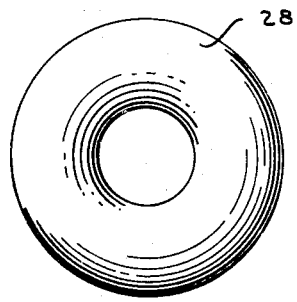
Fig. 4 is an end elevation of one of the resilient elements used with the resilient bushing of the present invention.

Fig. 5 discloses the novel method of forming the resilient bushing shown in Fig. 1, the various positions of the resilient element being shown as it is assembled in position on the carrier, and assembly tools being shown in position.

Figure 6:
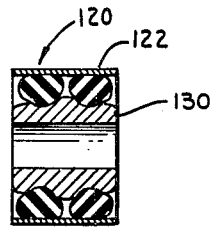

Fig. 6 is a side elevational midsection showing how the bushing of Fig. 1 may be formed as a separate unitary resilient bushing.

Figure 7:
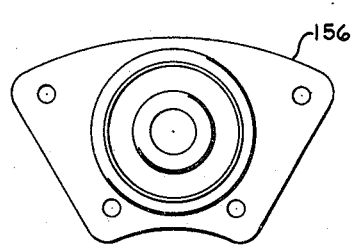

Fig. 7 is a side elevation of a flanged cup used with a bushing of the type shown in Fig. 6 to fasten the same to a bushing carrier.

Fig. 8 is a side elevational midsection of a resilient bushing showing another embodiment of the present invention, portions of the central connector member being broken away for clarity, Fig. 9 is a view similar to Fig. 8, the central connector member being of different construction.

Fig. 10 is an elevational midsection of the resilient element used in the bushings disclosed in Figs. 8 and 9.

Fig. 11 is a side elevational midsection of a resilient bushing showing another embodiment of the present invention.

Fig. 12 is a side elevational midsection of a resilient bushing showing another embodiment of the present invention.

Fig. 13 is a side elevational midsection of a resilient bushing showing still another embodiment of the present invention, portions of the central connector member being broken away for clarity.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

One embodiment of the present invention is shown in Figs. 1–7 of the drawings. Figs. 1–3 of the drawings demonstrate the use of the first embodiment of the resilient bushing construction of the present invention in a universal coupling of the type formed of a pair of complemental stampings which enclose a plurality of resilient bushings and form the outer shell thereof. A pair of flanged shaft hubs 10 and 12 are coupled by the carrier 14 and have flanges 16 and 18 formed thereon. The hubs 10 and 12 are provided with the splined portions 19 which are adapted to receive the mating splined ends of shafts which are to be coupled. Each flange 16 and 18 is attached to a pair of diametrically opposed resilient bushings indicated generally by the number 20. Each complete bushing 20 is comprised of an outer shell 22 formed on the stampings 24 and 26, a pair of resilient elements 28, and a central connector member 30.

The resilient body of the present invention differs from the resilient body construction shown in Guy Patent No.

1,978,940 in that it consists of two torus-shaped elements rather than a single resilient element. A single resilient body such as that shown in the above-mentioned patents will have much more stress concentration than a resilient body which is divided into separate elements such as the torus-shaped elements provided in the present construction.

In addition, the resilient elements 28 are disposed in the bushings 20 in an inverted or negative condition. This is accomplished by the method demonstrated in Fig. 5 of the drawings. A barrel-shaped central connector 30 is provided which has annular grooves 32 formed therein. A boss 34 extends from one end of the connector 30. The interior of the boss 34 is hollowed-out and screw-threaded as shown in Fig. 3 of the drawings. The interior 35 of the connector 30 is hollow, as indicated in Fig. 3 of the drawings to eliminate weight and adapt the connector for use with a locating tool during assembly of the bushing. Referring again to Fig. 5, a locating tool, such as the tool 36 having the stud 38 and the locating shoulder 40 annularly disposed around the stud 38, is placed against the end of the connector 30, which does not have the boss 34 extending therefrom. The stud 38 extends into the hollow interior 35 of the connector 30 and fits in close engagement therewith. The annular shoulder 40 is disposed against the end of the barrel-shaped connector and is shaped to provide a smooth curved portion 42 which blends into the contour of the connector, thus facilitating movement of a resilient element 28 along the tool 36 onto the connector 30.

In placing the torus-shaped resilient element 28 on the connector 30, the locating tool is fitted into position as shown in Fig. 5 of the drawings. One of the resilient elements 28 is then placed over the free end of the locating tool 36, and the said element 28 is moved along the tool 36 toward the connector 30. Certain portions of the element 28 have been numbered "1," "2," and "3" in Fig. 5. As the element 28 is rolled along, it will be seen that the positions of these numbered portions change. The curved portion 42 on the locating tool 36 provides a smooth path along which the element 28 is slipped onto the connector 30 and into the grooves 32. It will be noted that the portions 1, 2, and 3, which were normally on the lower inside of the element 28 are now on the upper outside of the element. Thus, the element 28 is positioned on the connector 30 in an inverted or negative position. The complemental stampings 24 and 26 can then be positioned so that the shell portions 22 fit over the outside of the inverted resilient element 28. The complemental stampings 24 and 26 are then fastened together in any suitable manner and a carrier 14 thus is formed. The carrier 14 is quickly and easily attached to the flanges 16 and 18 in the manner shown in Fig. 3 of the drawings. A bolt 44 extends through a hole 46 in the flange and is screwed into the screw-threaded portion on the interior of the connector 30. A recess 47 is formed in the flange to accommodate a reduced portion 48 on the end of the boss 34. This provides a proper seat for a shoulder portion 50 which is adjacent the reduced portion 48 on the boss 34. A lock washer 52 is used to assure a secure fastening of the bolt 44 to the connector 30.

A locating tool 53, similar to the tool 36, is adapted to fit adjacent the end of the connector 30 which contains the boss 34, as shown in Fig. 5 of the drawings. The tool 53 includes the hollowed recess 54 to accommodate the boss 34 on the connector 30. The function of the tool 53 is identical to that of the tool 36, previously explained. Sometimes a coupling is formed by the use of a disc-like central carrier plate which has pockets secured thereto to accommodate resilient bushings. An example of such a construction will be found in the Guy application, Serial No. 115,998, filed September 16, 1949, entitled, "Combined Resilient Bushing and Vibration Dampener." In such constructions, the bushing is formed with its own unitary outer shell 122, Fig. 6. The central connector 130 may be formed in any suitable manner to adapt it for connection to a shaft. The connector 130, shown in Fig. 6, is hollowed out to accommodate the pasage of a pin or bolt therethrough, but any other means may be used to connect the connector 130 to a driving or driven member. A flanged pocket member 156 is shown in Fig. 7 of the drawings. This pocket member is adapted to fit over the bushings 120 shown in Fig. 6 of the drawings in the manner disclosed in Guy application, Serial No. 115,-998, filed September 16, 1949.

It will be noted that the outer shell 122 in Fig. 6 is cylindrical. Although this is a satisfactory form of the present invention, it is preferred to have the outer shell formed with a peak at its midportion with tapering ends as shown in Figs. 1–3 of the drawing. The tapered outer shell tends to hold the resilient member 28 in tight engagement in the annular groove 32.

It has been found that treating the grooves 32 with an adhesive substance will aid in holding the resilient elements 28 in the grooves 32 during the assembly of the bushings.

When the outer shell 22, or the connector 30 of the bushing in Fig. 2 is moved either endwise or in an angular position, the elements 28 tend to return to their original molded or uninverted condition. Thus, any endwise or angular movement is aided and not restrained as in conventional bushings. In this manner, less heat is generated and the resilient element will withstand larger and more rapid movement than elements heretofore used. It will be seen that the same remarks apply to the bushing 120 shown in Fig. 6 when the outer shell 122 or central connector 130 is displaced from the normal position.

All embodiments of the invention shown in the drawings utilize a resilient element which is in an inverted or negative condition in the assembled position as described above.

A second embodiment of the present invention is disclosed in Figs. 8, 9, and 10 of the drawings. In this embodiment, the complemental stampings are formed to provide an outer tapered open groove, and the central connector member is formed to provide an inner tapered groove which will retain the resilient element in place.

The structures shown in Figs. 8 and 9 form a resilient bushing denoted generally as 20a. The outer shell 22a of the bushing 20a is formed by a pair of complemental stampings 24a and 26a. The central connector member 30a is disposed within the outer shell 22a and is spaced therefrom from the resilient element 28a (Fig. 10). The stampings 24a and 26a are formed with the flanges 60a and 62a respectively. These flanges provide a tapered annular groove 63a adapted to seat the key 72a of the resilient element 28a. The central connector member 30a is formed of complemental parts 66a and 68a to facilitate assembly of the bushing. The parts 66a and 68a are formed to provide a central groove 70a adapted to seat the key 64a of the resilient element 28a. It will be noted that the parts 66a and 68a are of different constructions in Figs. 8 and 9.

The parts 66a and 68a are held in the assembled position by a bolt and nut assembly 74a which also extends through a flange or the like 76a to be connected through the bushing.

The resilient element 28a is placed in the inverted condition as explained in connection with the first embodiment of the present invention. The resilient element 28a is effectively held in position in the bushing assembly by the keys 64a and 72a. In the inverted condition of the resilient element 28a, the key 64a is disposed in the inner groove 70a provided by the central connector member 30a, and the key 72a is disposed in the groove 63a formed by the stamping flanges 60a and 62a.

The third embodiment of the present invention is shown in Fig. 11. This embodiment differs from the second embodiment, which is shown in Figs. 8, 9, and 10, in that the flanges 60b and 62b are straight rather than tapered; the groove 70b in the central connector member has straight rather than tapered sidewalls; and the central connector member is formed as one piece rather than two.

The fourth embodiment of the present invention is shown in Fig. 12. This embodiment is similar to the third embodiment, which is shown in Fig. 11, except that the flanges 60c and 62c taper and engage each other at their outer portions to form a closed groove. Further, no outer key is initially formed in the resilient member 28c. Instead, when the resilient member is placed in the bushing assembly under pressure, a portion of the member will extend into the groove 63c to create an interlocking key 64c.

The fifth embodiment of the present invention is shown in Fig. 13. In this construction, a plurality of inner grooves 70d are formed on the central connector member 30d. A plurality of outer grooves 63d are formed in the complemental stampings 24d and 26d. The outer shell 22d formed by the stampings has a contour similar to the contour of the central connector member.

The resilient bushings described herein are simple and efficient and tests have been conducted which indicate that these bushings will withstand loads three times greater than the breaking load of conventional bushings. This greater efficiency is provided within a bushing which is at most no larger than conventional bushings. Stress concentration is reduced to a minimum and the heat of operation of the bushing is greatly reduced. All these advantages evolve from a construction which is extremely simple and economical, and which eliminates bonding processes and reinforcement constructions. In addition, we have provided a method for forming such a resilient bushing which is simple and which will provide bushings in large numbers at a rapid rate of speed.

Having thus described our invention, we claim:

A resilient bushing comprising a central connector member having a groove formed therein, an outer shell spaced from said connector member and also having a groove formed therein, and a substantially torus-shaped resilient element having an outer key on its outer periphery and an inner key on its inner periphery and being disposed between said connector member and outer shell in inverted balanced position, with the outer key disposed in the groove in the connector member and the inner key disposed in the groove in the outer shell, said resilient element thus having an internal force which tends to return it to its normal position when displaced from its balanced position.

References Cited in the file of this patent

UNITED STATES PATENTS

| | | |
|---|---|---|
| 1,779,663 | Cowell | Oct. 28, 1930 |
| 2,115,713 | Haire | May 3, 1938 |
| 2,179,959 | Opsahl | Nov. 14, 1939 |
| 2,282,239 | Schroedter | May 5, 1942 |

FOREIGN PATENTS

| | | |
|---|---|---|
| 151,751 | Switzerland | 1932 |
| 778,691 | France | 1935 |
| 484,877 | Great Britain | 1938 |